(12) United States Patent
Yamamoto et al.

(10) Patent No.: US 12,566,513 B2
(45) Date of Patent: *Mar. 3, 2026

(54) METHOD AND DEVICE FOR DERIVING PEN POSITION AND REPORTING PEN POSITION TO HOST COMPUTER

(71) Applicant: Wacom Co., Ltd., Saitama (JP)

(72) Inventors: Sadao Yamamoto, Saitama (JP);
Yoshio Nomura, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/828,992

(22) Filed: Sep. 9, 2024

(65) Prior Publication Data

US 2024/0427449 A1      Dec. 26, 2024

Related U.S. Application Data

(63) Continuation of application No. 18/166,321, filed on Feb. 8, 2023, now Pat. No. 12,111,995, which is a
(Continued)

(30) Foreign Application Priority Data

Sep. 3, 2019    (JP) ................................. 2019-160083

(51) Int. Cl.
$G06F\ 3/041$ (2006.01)
$G06F\ 3/0354$ (2013.01)
$G06F\ 9/54$ (2006.01)
(52) U.S. Cl.
CPC ...... G06F 3/04162 (2019.05); G06F 3/03545 (2013.01); G06F 3/04166 (2019.05); G06F 9/542 (2013.01); G06F 9/544 (2013.01)

(58) Field of Classification Search
CPC ............. G06F 3/04162; G06F 3/04166; G06F 3/03545; G06F 9/542; G06F 9/544
See application file for complete search history.

(56) References Cited

U.S. PATENT DOCUMENTS

| | | | |
|---|---|---|---|
| 10,061,408 B2 | 8/2018 | Hara | |
| 10,209,829 B2 | 2/2019 | Hara | |
| (Continued) | | | |

FOREIGN PATENT DOCUMENTS

| | | |
|---|---|---|
| JP | H11341456 A | 12/1999 |
| JP | 2018026165 A | 2/2018 |
| (Continued) | | |

OTHER PUBLICATIONS

Japanese Notice of Reasons for Refusal dated Oct. 24, 2023, for the corresponding Japanese Patent Application No. 2022-007078, 4 pages. (With English Translation).
(Continued)

*Primary Examiner* — Lisa S Landis
(74) *Attorney, Agent, or Firm* — Seed Intellectual Property Law Group LLP

(57)          ABSTRACT

A method performed by a device (e.g., touch controller) includes deriving a pen position, and transmitting a report indicating the derived pen position to a host computer. The report includes a first area storing position data indicating the derived position and a second area storing non-position data different from the position data. The method includes securing a buffer area for retaining a plurality of the reports in a memory, deriving the pen position at each determined scanning time, and generating a report including the position data indicating the derived position. The method includes storing the report in the buffer area and, in response to obtaining the non-position data, writing the non-position data in the second area of each of one or more of the reports stored in the buffer area. The method includes transmitting
(Continued)

the plurality of the reports stored in the buffer area to the host computer.

20 Claims, 10 Drawing Sheets

Related U.S. Application Data continuation of application No. 16/943,670, filed on Jul. 30, 2020, now Pat. No. 11,599,219.

(56) References Cited

U.S. PATENT DOCUMENTS

| | | | | |
|---|---|---|---|---|
| 2015/0160851 | A1* | 6/2015 | Michihata | G06F 3/03545 |
| | | | | 345/174 |
| 2015/0338930 | A1 | 11/2015 | Hara | |
| 2015/0378450 | A1 | 12/2015 | Petkov et al. | |
| 2016/0188018 | A1 | 6/2016 | Handa | |
| 2016/0283777 | A1 | 9/2016 | Holden et al. | |
| 2017/0097695 | A1 | 4/2017 | Ribeiro et al. | |
| 2017/0285772 | A1 | 10/2017 | Yamamoto | |
| 2018/0181212 | A1 | 6/2018 | Miyazawa et al. | |
| 2019/0042009 | A1 | 2/2019 | Kumar et al. | |
| 2019/0187823 | A1 | 6/2019 | Kake et al. | |
| 2020/0004367 | A1 | 1/2020 | Lee et al. | |
| 2020/0026383 | A1 | 1/2020 | Hwang et al. | |
| 2020/0073489 | A1 | 3/2020 | Abzarian et al. | |

FOREIGN PATENT DOCUMENTS

| | | |
|---|---|---|
| JP | 2019133239 A | 8/2019 |
| JP | 2019136513 A | 8/2019 |
| JP | 2019160083 A | 9/2019 |
| WO | WO 2015111159 A1 | 7/2015 |
| WO | WO 2018029855 A1 | 2/2018 |
| WO | WO 2019237448 A1 | 12/2019 |
| WO | WO 2020019616 A1 | 1/2020 |

OTHER PUBLICATIONS

Office Action, issued Jul. 13, 2021, for Japanese Patent Application No. 2019-160083. (7 pages) (with English Translation).
Office Action, issued Sep. 21, 2021, for Japanese Patent Application No. 2019- 160083. (8 pages) (with English Translation).

* cited by examiner

F I G . 6
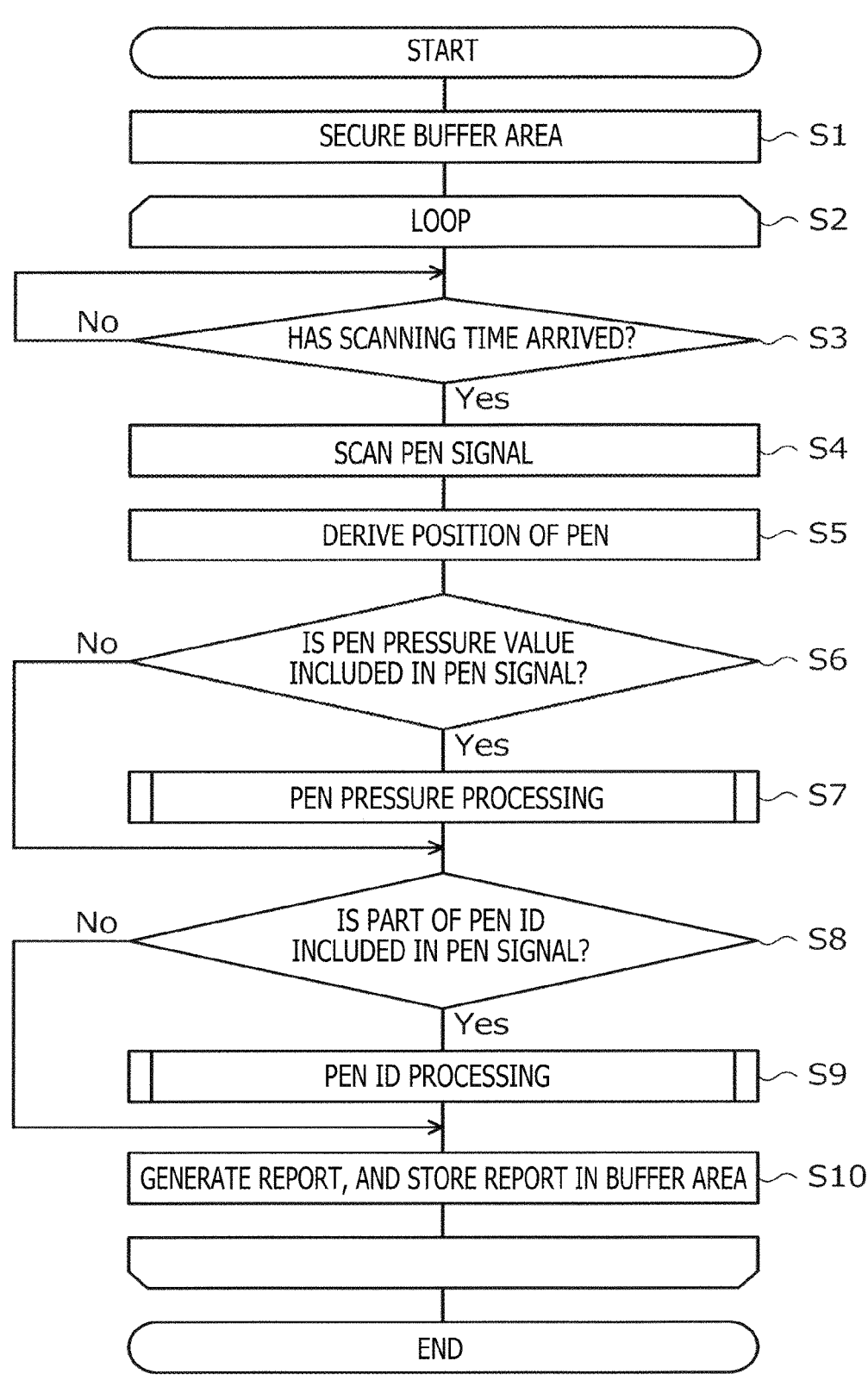

F I G . 7

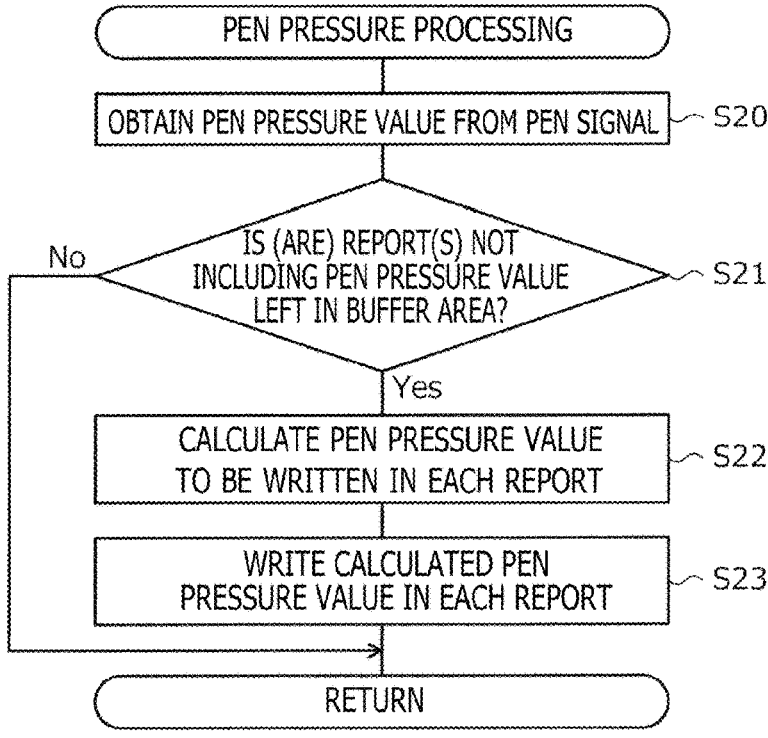

PEN PRESSURE PROCESSING

OBTAIN PEN PRESSURE VALUE FROM PEN SIGNAL — S20

IS (ARE) REPORT(S) NOT INCLUDING PEN PRESSURE VALUE LEFT IN BUFFER AREA? — S21

No

Yes

CALCULATE PEN PRESSURE VALUE TO BE WRITTEN IN EACH REPORT — S22

WRITE CALCULATED PEN PRESSURE VALUE IN EACH REPORT — S23

RETURN

F I G . 8

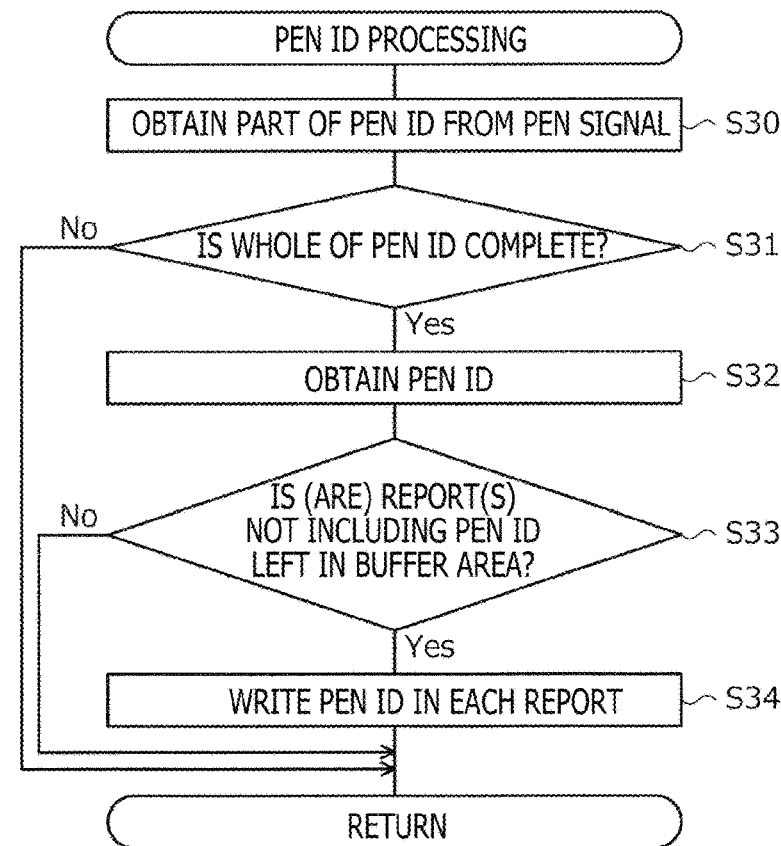

PEN ID PROCESSING

OBTAIN PART OF PEN ID FROM PEN SIGNAL — S30

IS WHOLE OF PEN ID COMPLETE? — S31

No

Yes

OBTAIN PEN ID — S32

IS (ARE) REPORT(S) NOT INCLUDING PEN ID LEFT IN BUFFER AREA? — S33

No

Yes

WRITE PEN ID IN EACH REPORT — S34

RETURN

METHOD AND DEVICE FOR DERIVING PEN POSITION AND REPORTING PEN POSITION TO HOST COMPUTER

BACKGROUND

Technical Field

The present disclosure relates to a method and a device (e.g., a touch controller) for deriving a pen position, and transmitting a report indicating the derived pen position to a host computer.

Description of the Related Art

Various known devices are used to receive pen input (hereinafter referred to as a "pen input system"), such as a tablet computer, a digitizer, or the like. A pen input system generally includes a device used to derive a position of a pen (a "pen position"), and a host computer executing an operating system and various applications. The device is configured to generate a report indicating the derived pen position and to transmit the report to the host computer each time the device derives a pen position. The host computer performs processing, for example, to generate and draw stroke data formed by a series of positions, from a pen-down to a pen-up, based on the report thus supplied from the device.

The report transmitted by the device includes not only data indicating the pen position (hereinafter referred to as "position data") but also various kinds of data (hereinafter referred to as "non-position data"). The non-position data includes data that does not change with time, such as a pen identification (ID) stored in each pen in advance (hereinafter referred to as "static data"), and data that may be obtained less frequently than the position data, such as a pen pressure value indicating the value of a pressure applied to a pen tip (pen pressure), or tilt data indicating the tilt of a pen (hereinafter referred to as "less-frequent data").

The device, after receiving the static data from a pen, includes the static data in each report to be transmitted thereafter. In a case where a report received from the device includes the static data, the host computer generates stroke data that corresponds to the static data. For example, in a case where the report includes a pen ID and a certain drawing color is set in association with the pen ID in an application, the host computer draws the stroke data in the set drawing color.

When the device obtains less-frequent data by, for example, receiving the less-frequent data from a pen, the device includes the less-frequent data in a report to be transmitted next. In a case where the less-frequent data is included in the report received from the device, the host computer generates stroke data that corresponds to the less-frequent data. For example, in a case where a pen pressure value is included in the report, the host computer may set a line width, transparency, etc. of the stroke data that corresponds to the pen pressure value.

International Publication WO 2015/111159 discloses a pen that divides a pen ID of a large data size into a plurality of pen IDs and transmits the plurality of pen IDs. The pen is configured to transmit a pen pressure value each time the pen transmits a divided pen ID. On the other hand, International Publication WO 2018/029855 discloses a pen that stops transmitting a pen pressure value during the transmission of a pen ID.

However, according to the methods of the background art, when non-position data is not included in a report from the device, the host computer cannot generate stroke data that corresponds to the non-position data. As a result, a problem may occur in drawing processing that, for example, a pen color set by a user is not reflected in the drawing color of the stroke data, or a force with which the user presses the pen against a panel is not reflected in the line width of the stroke data.

According to one aspect of the present disclosure, the host computer is enabled to generate stroke data that corresponds to the non-position data, which is as up-to-date as possible.

According to the pens in the background art, the pen pressure value may change sharply (abruptly) at a time of a pen-up (i.e., when a pen is lifted from the panel). When the pen pressure value changes abruptly, the line width or transparency of the drawn stroke data correspondingly changes abruptly, which may be aesthetically not pleasing.

BRIEF SUMMARY

An aspect of the present disclosure is directed to mitigating or reducing a sharp change in the pen pressure value at a time of a pen-up, to thereby render natural-looking handwriting.

According to a first aspect of the present disclosure, a method performed by a device (e.g., a touch controller) is provided, for deriving a pen position, and transmitting a report indicating the derived pen position to a host computer. The report includes a first area storing position data indicating the derived position and a second area storing non-position data different from the position data. The method includes securing a buffer area for retaining a plurality of the reports in a memory, deriving the pen position at each determined (e.g., predetermined) scanning time, and generating a report including the position data indicating the derived position. The method includes storing the report in the buffer area and, in response to obtaining non-position data, writing the non-position data in the second area of each of one or more of the reports stored in the buffer area. The method includes transmitting the plurality of the reports stored in the buffer area to the host computer.

According to the first aspect of the present disclosure, a touch controller is provided for deriving a pen position, and transmitting, to a host computer, a report including a first area storing position data indicating the derived pen position and a second area storing non-position data different from the position data. The touch controller secures a buffer area for retaining a plurality of the reports in a memory, derives the pen position at each determined scanning time, and generates a report including the position data indicating the derived position. The touch controller stores the report in the buffer area and, in response to obtaining non-position data, writes the non-position data in the second area of each of one or more of the reports stored in the buffer area. The touch controller transmits the plurality of the reports stored in the buffer area to the host computer.

According to a second aspect of the present disclosure, a method performed by a device (e.g., a touch controller) is provided, for deriving a pen position, and transmitting a report indicating the derived pen position to a host computer. The method includes deriving the pen position at each determined scanning time, and generating the report including position data indicating the derived position and a pen pressure value indicating a pressure applied to a pen tip of the pen. The method includes sequentially transmitting the generated reports to the host computer, and processing one or more of the pen pressure values included in one or more of the reports yet to be transmitted in response to detection of a pen-up event, wherein the pen-up event is a separation of the pen from a panel.

According to the second aspect of the present disclosure, a touch controller is provided for deriving a pen position, and transmitting a report indicating the derived pen position to a host computer. The touch controller derives the pen position at each determined scanning time, and generates the report including position data indicating the derived position and a pen pressure value indicating a pressure applied to a pen tip of the pen. The touch controller sequentially transmits the generated report to the host computer, and processes one or more pen pressure values included in one or more reports yet to be transmitted in response to detection of a pen-up event, wherein the pen-up event is a separation of the pen from a panel.

According to the first aspect of the present disclosure, the non-position data corresponding to the last-obtained non-position data is written in reports, which have been already generated prior to when the non-position data is obtained. The host computer can therefore generate stroke data that corresponds to the non-position data, which is as up-to-date as possible.

According to the second aspect of the present disclosure, the pen pressure value(s) included in the report(s) yet to be transmitted is (are) processed in response to the detection of a pen-up event. Thus, a sharp or abrupt change in the pen pressure value at the time of a pen-up event can be mitigated, to render natural-looking handwriting.

BRIEF DESCRIPTION OF THE SEVERAL VIEWS OF THE DRAWINGS

FIG. 6 is a diagram depicting a processing flow of report generation processing performed by the device according to the first embodiment of the present disclosure;

FIG. 7 is a diagram depicting details of pen pressure processing performed in step S7 of FIG. 6;

FIG. 8 is a diagram depicting details of pen ID processing performed in step S9 of FIG. 6;

DETAILED DESCRIPTION

Embodiments of the present disclosure will hereinafter be described in detail with reference to the accompanying drawings.

Figure 1:
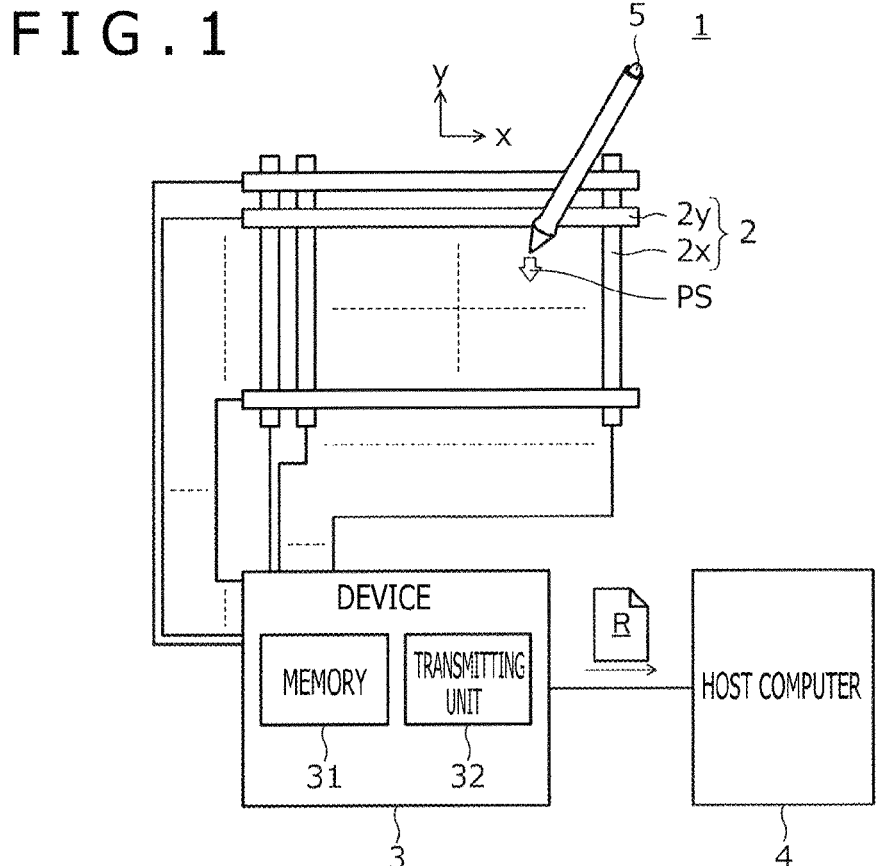
FIG. 1 is a diagram depicting a configuration of a pen input system according to a first embodiment of the present disclosure.

FIG. 1 is a diagram depicting a configuration of a pen input system 1 according to a first embodiment of the present disclosure. The pen input system 1 is a system for receiving input by a pen 5 depicted in the figure. The pen input system 1 is configured with a touch surface for pen input. In a specific example, the pen input system 1 is a tablet computer or a digitizer. In the former case, the touch surface is formed by a panel surface of a display.

As depicted in FIG. 1, the pen input system 1 includes a sensor electrode group 2, a device 3 (e.g., a touch controller), and a host computer 4. The sensor electrode group 2 is a plurality of sensor electrodes arranged directly under the touch surface. The plurality of sensor electrodes constituting the sensor electrode group 2 include: a plurality of X-electrodes $2x$ that each extend in a y-direction depicted in the figure and are arranged at equal intervals in an x-direction (a direction orthogonal to the y-direction); and a plurality of Y-electrodes $2y$ that each extend in the x-direction depicted in the figure and are arranged at equal intervals in the y-direction.

The device 3 is an integrated circuit connected to the sensor electrode group 2. The device 3 includes a memory 31 and a transmitting unit 32. The device 3 has a function of periodically deriving the pen position within the touch surface, and is configured to transmit a report R indicating the derived pen position to the host computer 4 each time the device 3 derives the pen position. Such a device 3 is generally referred to also as a sensor controller or a touch controller.

Various methods or systems can be employed by the device 3 to derive a pen position. For example, an active capacitive coupling system is suitably used as the position deriving method. In a case where the active capacitive coupling system is used, the device 3 is configured to use the sensor electrode group 2 to receive a pen signal PS transmitted from the pen 5 to thereby derive the pen position.

The pen signal PS will be described in detail. The pen signal PS includes a burst signal as an unmodulated carrier signal and a data signal formed as a signal modulated with various kinds of data. The burst signal is a signal used for the device 3 to derive the pen position (the position of the pen 5). Specifically, the device 3 detects the reception strength of the burst signal in each of the plurality of sensor electrodes constituting the sensor electrode group 2. The device 3 then derives the pen position based on the position of each sensor electrode and the reception strength in each sensor electrode.

In contrast, the data signal is a signal used to transmit various kinds of data from the pen 5 to the device 3. The various kinds of data transmitted by the data signal include a pen ID uniquely assigned to each of a plurality of pens 5, a pen pressure value indicating a pressure applied to the pen tip of the pen 5, and the like. The pen ID is stored in a memory of the pen 5 in advance. The pen pressure value is detected by a pressure sensor included in the pen 5.

The device 3 and the pen 5 may be configured to be able to transmit and receive signals bidirectionally (two-way communication), or may be configured to be able to transmit a signal only from the pen 5 to the device 3 (one-way communication).

In a case where the device 3 and the pen 5 perform two-way communication, the device 3 is configured to transmit an uplink signal via the sensor electrode group 2 in each fixed period, and the pen 5 is configured to transmit the pen signal PS in response to reception of the uplink signal. In this case, the device 3 sends a command in the uplink signal to the pen 5, which specifies what data is requested to be transmitted from the pen 5 as the data signal in the pen signal PS. The data requested in this manner includes the pen ID, described above.

In a case where the device 3 and the pen 5 perform one-way communication, in contrast, the pen 5 is configured to transmit the pen signal PS including the burst signal and the pen pressure value (less-frequent data) in normal operation, and to transmit the pen signal PS including the burst signal and the pen ID (static data) in response to detection of a pen-down (i.e., a pen contact with the touch surface) based on a change in the pen pressure value. Thus, the device 3 can obtain the pen ID of a newly detected pen 5.

Figure 2:
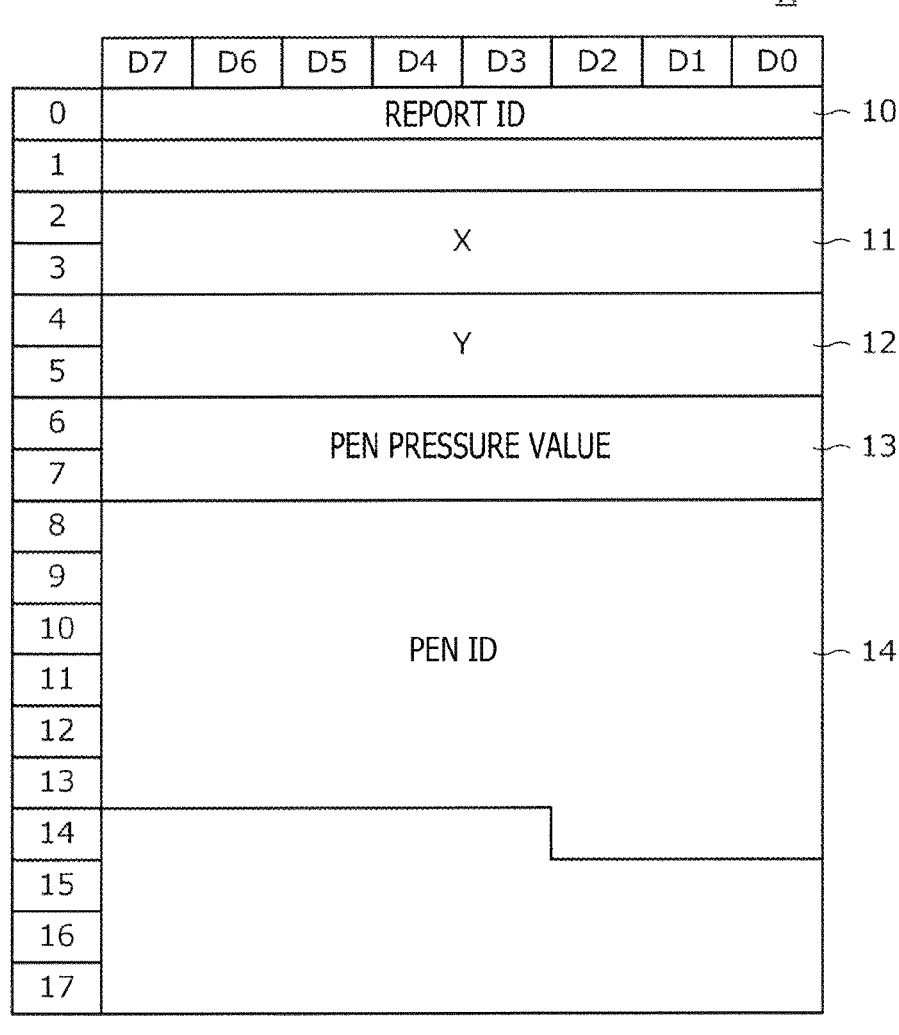
FIG. 2 is a diagram depicting an example of a data structure of a report transmitted from a device to a host computer.

FIG. 2 is a diagram depicting an example of a data structure of a report R transmitted from the device 3 to the host computer 4. While the figure depicts an example of a report R formed by data of 18 bytes, the data size of the report R is not limited to 18 bytes.

As depicted in FIG. 2, the report R includes a report ID area 10 storing a report ID, an X-coordinate area 11 storing an X-coordinate, a Y-coordinate area 12 storing a Y-coordinate, a pen pressure value area 13 storing the pen pressure value, and a pen ID area 14 storing the pen ID.

The report ID is data of 1 byte indicating the order of generation of a plurality of reports R sequentially transmitted from the device 3 to the host computer 4. The host computer 4 is configured to obtain the order of generation of each report R based on the report ID, and process the reports R in the generation order.

The X-coordinate and the Y-coordinate are data (position data) indicating the pen position (the position of the pen 5) which is derived by the device 3. The X-coordinate and the Y-coordinate are each formed by data of 2 bytes. The X-coordinate area 11 and the Y-coordinate area 12 therefore constitute an area (first area) storing the position data indicating the pen position derived by the device 3. The device 3 generates a new report R each time the device 3 derives a new pen position, and respectively stores a derived X-coordinate and a derived Y-coordinate in the X-coordinate area 11 and the Y-coordinate area 12 in the report R.

The pen pressure value and the pen ID are both non-position data different from the position data. The pen pressure value area 13 and the pen ID area 14 therefore constitute an area (second area) storing the non-position data. The pen pressure value corresponds to the above-mentioned less-frequent data (data which may be obtained less frequently than the position data). The pen ID corresponds to the above-mentioned static data (data which does not change per each scanning time to be described later).

The pen pressure value is, for example, data of 16 bits. However, the pen pressure value may be formed by shorter data of, for example, 12 bits or the like, or by longer data. In principle, the device 3 stores the pen pressure value included in the pen signal PS into the pen pressure value area

13. However, at a time of transmission of a pen ID having a large data size, for example, the pen 5 may omit arranging the pen position pressure value in the pen signal PS. In this case, in the background art, the pen pressure value area 13 is left blank. In contrast, the device 3 according to the present embodiment is configured to derive the pen pressure value to be stored in the pen pressure value area 13 from a previous or subsequent pen pressure value, and write the derived pen pressure value to the pen pressure value area 13 of any report R remaining in a buffer area B to be described later. Details of this aspect of the present disclosure will be described later.

The pen ID is, for example, data of 51 bits. Specifically, the pen ID may be formed by a combination of a vendor ID, a serial ID, and a device ID. Because of the large data size, the transmission of the pen ID from the pen 5 to the device 3 is usually performed in a manner divided in a plurality of pen signals PS (for example, four pen signals PS). When the device 3 receives all of divided data of the pen ID thus transmitted in a divided manner, the device 3 reconstructs the original pen ID. Then, the device 3 stores the reconstructed pen ID in the pen ID areas 14 of all of reports R to be thereafter transmitted. In the background art, the pen ID area 14 of a report R already generated before the reconstruction of the pen ID is left blank. In contrast, the device 3 according to the present embodiment is configured to write the reconstructed pen ID in the pen ID area 14 of any report R remaining in the buffer area B to be described later. This aspect will also be described in detail later.

Figure 3:
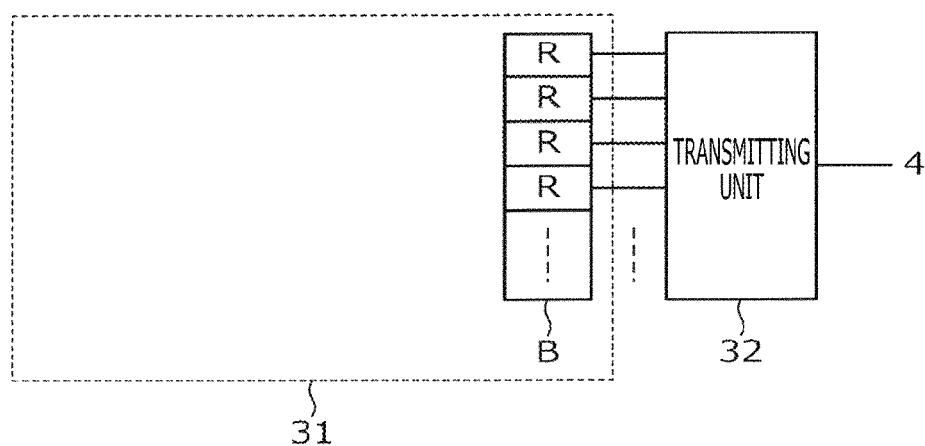
FIG. 3 is a diagram explaining a method of transmitting reports from the device.

FIG. 3 is a diagram explaining a method of transmitting reports R from the device 3. The device 3 first secures a buffer area B for retaining a plurality of reports R in the memory 31. The buffer area B is configured as a first-in first-out queue. Then, the device 3 derives the pen position (the position of the pen 5) at each determined (e.g., predetermined) scanning time, and generates a report R including position data indicating the derived position and stores the report R in the buffer area B each time the device 3 derives the pen position.

Each report R stored in the buffer area B is extracted according to the order of generation (i.e., order in which the reports R are generated) and transmitted to the host computer 4 by the transmitting unit 32. The report R extracted by the transmitting unit 32 is deleted from the buffer area B. Various transmitting methods of the transmitting unit 32 are possible. The transmission of each report R to the host computer 4 is preferably implemented by, for example, configuring the transmitting unit 32 by a first-in first-out queue storing the reports R in the generation order, and periodically performing polling from the host computer 4 to the transmitting unit 32.

Referring back to FIG. 1, the host computer 4 is a device including a processor and a memory and various input-output devices such as a display, a communicating device, and the like. The device 3 constitutes one of the various input-output devices provided to the host computer 4. The host computer 4 is configured to be able to execute an operating system and various applications. The various applications include a drawing application that generates and draws stroke data based on pen input.

Specifically describing a part of functions of the drawing application related to pen input, when the drawing application receives a report R from the device 3, the drawing application first obtains position data in the report R. Then, the drawing application generates stroke data formed by a series of control points based on a plurality of pieces of position data sequentially obtained. In a case where the pen ID is included in the report R, the drawing application performs processing based on the pen ID. The processing may be, for example, processing to set a drawing color to the stroke data in a case where the drawing color is set in association with the pen ID in the application. Further, in a case where the pen pressure value is included in the report R, the drawing application performs processing of setting a line width, a transparency, or the like, of the stroke data according to the pen pressure value.

Detailed description will next be made of the writing operation to write, to each report R remaining in the buffer area B, the pen pressure value and the pen ID obtained after the report R has been generated.

Figure 4:
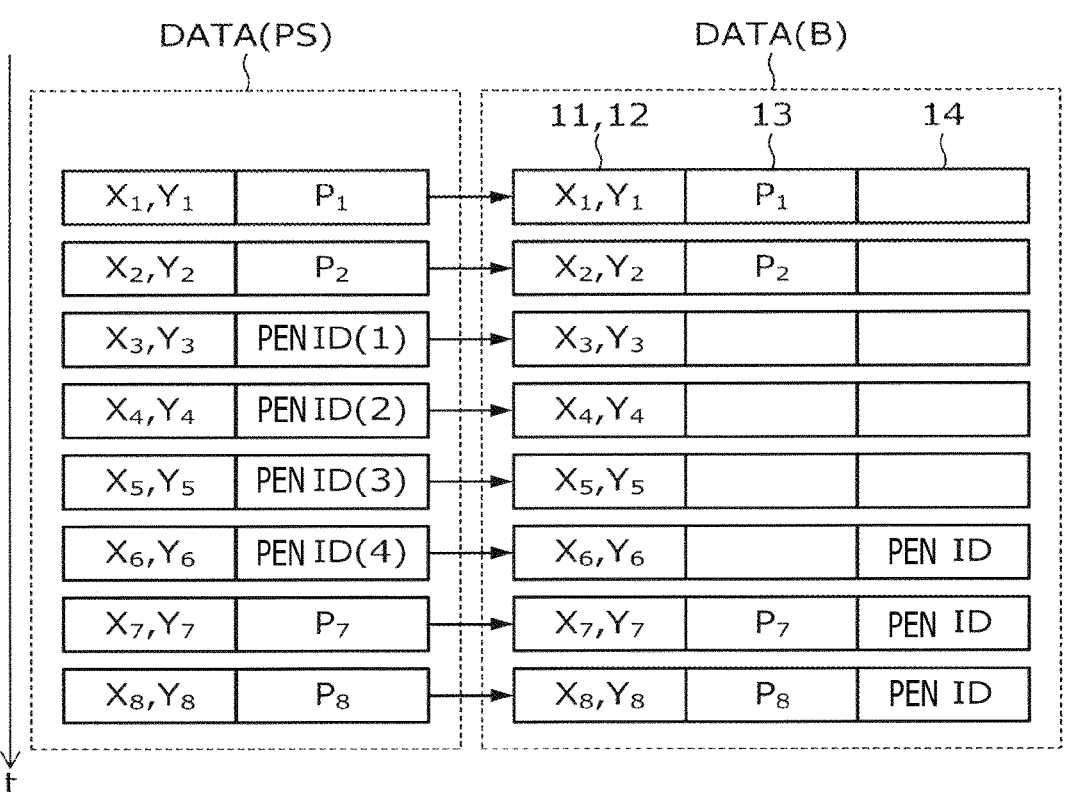
FIG. 4 is a diagram depicting a time sequential relationship between data DATA (PS) obtained from pen signals (PS) and data DATA (B) written as reports in a buffer area (B)

FIG. 4 is a diagram depicting a time sequential relationship between data DATA (PS) obtained from pen signals PS and data DATA (B) written as reports R in the buffer area B. The figure depicts a state before the writing operation according to the present embodiment is performed with respect to each report R in the buffer area B. As depicted in the figure, each time the device 3 derives the pen position ($(X_1, Y_1)$ or the like) based on a pen signal PS, the device 3 generates a report R including position data indicating the derived position, and stores the report R in the buffer area B.

In the example of FIG. 4, pen pressure values ($P_1$ and the like) are obtained from a first, a second, a seventh, and an eighth pen signal PS, whereas no pen pressure value is obtained from a third to a sixth pen signal PS. This is because these (third- to six-) pen signals PS are used to transmit the pen ID, and thus the pen signals PS do not include a pen pressure value. As a result, no pen pressure value is included in the third to sixth reports R.

The third to sixth pen signals PS include divided data (pen ID (1) to pen ID (4)) of the pen ID. Accordingly, while all of the sixth and subsequent reports R include the pen ID, all of the reports R up to the fifth report R do not include the pen ID.

When no pen pressure value is included in the reports R, the host computer 4 cannot generate the stroke data that corresponds to any pen pressure value, for example the last-obtained pen pressure value. Then, a force with which a user presses the pen against the panel cannot be reflected in the line width of the stroke data, for example, which is problematic. When the pen ID is not included in the reports R, the host computer 4 cannot generate the stroke data that corresponds to the pen ID. Then, for example, a pen color set by the user in association with the pen ID cannot be reflected in the drawing color of the stroke data, which is problematic. Accordingly, the device 3 according to the present embodiment performs the writing operation of writing the non-position data, such as the pen pressure value, the pen ID, and the like, within one or more reports R stored in the buffer area B in response to obtaining the non-position data.

Figure 5:
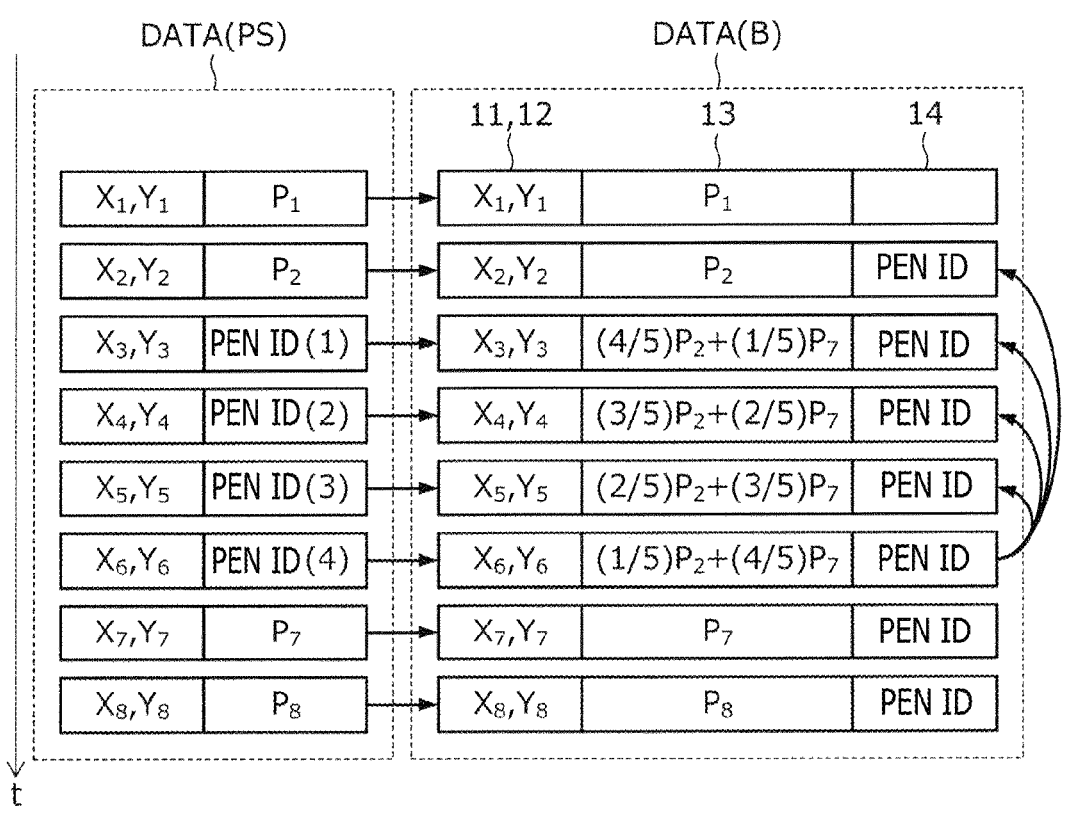
FIG. 5 is a diagram depicting a state of each of the reports in the buffer area (B) after the non-position data writing operation according to the first embodiment of the present disclosure is performed.

FIG. 5 is a diagram depicting a sample state of each of the reports R in the buffer area B after the writing operation according to the present disclosure has been performed. First, regarding pen pressure values, in response to obtaining a pen pressure value, the device 3 writes a pen pressure value, which is derived based on the pen pressure value which is last-obtained in the past and/or the pen pressure value currently obtained, to the pen pressure value area 13 of each of one or more reports R stored in the buffer area B. (That is, the last obtained value, or the currently obtained value, or both the last obtained value and the currently obtained value may be used to derive a value.) Taking the seventh report R depicted in FIG. 5 as an example, the "last-obtained pen pressure value" is a pen pressure value $P_2$ which has been obtained from the second pen signal PS. The "currently obtained pen pressure value" is a pen pressure value $P_7$ obtained from the seventh pen signal PS. Then, the device 3 calculates pen pressure values for the third to sixth reports R, from which the pen pressure values have been omitted, according to the following Equation (1), for example, and writes the calculated pen pressure values to the pen pressure value areas 13 of the respective reports R. Equation (1) is an equation that calculates, based on a pen pressure value $P_n$ (n is an integer of 0 or more) included in an nth report R and a pen pressure value $P_{n+m}$ (m is an integer of 2 or more) included in an (n+m)th report R, a pen pressure value $P_{n+k}$ (k is an integer of 1 to m−1 both inclusive) to be included in an (n+k)th report R. As for the seventh report R depicted in FIGS. 5, n=2, m=5, and k=1 to 4. In a case where Equation (1) is used to calculate the pen pressure values, the device 3 preferably retains the last-obtained pen pressure value in the memory 31.

$$P_{n+k} = \frac{m-k}{m}P_n + \frac{k}{m}P_{n+m} \qquad (1)$$

Next, describing the pen ID, in response to obtaining the pen ID based on the divided data received sequentially, the device 3 writes the obtained pen ID to the pen ID area 14 of each of one or more reports R stored in the buffer area B. FIG. 5 illustrates a case where the second and subsequent reports R remain in the buffer area B without being deleted at a time when the pen ID is obtained by the device 3 (i.e., the first report R has already been transmitted and thus deleted). In this case, the device 3 writes the obtained pen ID in the pen ID areas 14 of the second to fifth reports R stored in the buffer area B.

By writing the non-position data such as the pen pressure values, the pen ID, and the like as described above, the device 3 can write the non-position data corresponding to (at least) the last-obtained non-position data in the reports R, which have been generated before obtaining the non-position data. The host computer 4 can therefore generate the stroke data that corresponds to the non-position data, which is as up-to-date as possible.

FIG. 6 is a diagram depicting a processing flow of report generation processing performed by the device 3 according to the present embodiment.

The device 3 first secures the buffer area B for retaining a plurality of reports R in the memory 31, as also depicted in FIG. 3 (step S1). The device 3 next performs the processing of steps S3 to S10 repeatedly (step S2).

In the loop processing of step S2, the device 3 first waits for the arrival of a periodically-set scanning time (step S3). When the scanning time arrives, the device 3 scans the pen signal PS (step S4), and derives the pen position based on a result of the scanning (step S5).

Next, the device 3 determines whether or not a pen pressure value is included in the pen signal PS (step S6). When the device 3 determines that no pen pressure value is included in the pen signal PS, the device 3 then advances the processing to step S8. When the device 3 determines that a pen pressure value is included in the pen signal PS, on the other hand, the device 3 performs pen pressure processing (step S7).

FIG. 7 is a diagram depicting details of the pen pressure processing performed in step S7. As depicted in the figure, the device 3 first obtains the pen pressure value from the pen signal PS (step S20). Next, the device 3 determines whether or not a report(s) R not including a pen pressure value remain(s) in the buffer area B (step S21). When the device 3 determines that a report(s) R not including a pen pressure value remain(s) in the buffer area B, the device 3 first calculates a pen pressure value to be included in each report R by using the above-described Equation (1), for example (step S22). Then, the device 3 writes the calculated pen pressure value within each report R (step S23), and ends the pen pressure processing. When the device 3 determines in step S21 that a report(s) R not including a pen pressure value do(es) not remain in the buffer area B, the device 3 ends the pen pressure processing without performing the processing of steps S22 and S23.

Referring back to FIG. 6, the device 3 next determines whether or not a part of the pen ID (divided data) is included in the pen signal PS (step S8). When the device 3 determines that a part of the pen ID (divided data) is not included in the pen signal PS, the device 3 then advances the processing to step S10. When the device 3 determines that a part of the pen ID (divided data) is included in the pen signal PS, on the other hand, the device 3 performs pen ID processing (step S9).

FIG. 8 is a diagram depicting details of the pen ID processing performed in step S9. As depicted in the figure, the device 3 first obtains a part of the pen ID from the pen signal PS (step S30). The device 3 next determines whether or not the whole (entirety) of the pen ID is complete (step S31). When the device 3 determines that the whole of the pen ID is complete, the device 3 obtains the pen ID from the divided data received thus far (step S32). When the device 3 determines in step S31 that the whole of the pen ID is not complete, on the other hand, the device 3 ends the pen ID processing.

Having obtained the pen ID in step S32, the device 3 next determines whether or not a report(s) R not including the pen ID remain(s) in the buffer area B (step S33). When the device 3 determines that a report(s) R not including the pen ID remain(s) in the buffer area B, the device 3 writes the pen ID within each remaining report R (step S34), and ends the pen ID processing.

Referring back to FIG. 6, the device 3 next generates a report R, and stores the report R in the buffer area B (step S10). The report R includes not only position data indicating the pen position which is derived in step S5, but also each of a pen pressure value in a case where the pen pressure value is currently obtained in step S20 and the pen ID in a case where the pen ID has been obtained in step S32. The report R stored in the buffer area B is later extracted in the order of generation, and transmitted to the host computer by the transmitting unit 32, as described above. The report generation processing is repeated after returning to step S3.

As described above, according to the method performed by the device 3 according to the present embodiment, the non-position data corresponding to the last-obtained non-position data can be written to a report R already generated before the non-position data (static data and less-frequent data) is obtained. The host computer 4 can therefore generate the stroke data that corresponds to the non-position data, which is as up-to-date as possible.

While the pen ID is cited as static data to be written in the report(s) R in the present embodiment, other kinds of static data, such as the vendor ID for identifying the vendor of the pen 5, a color set for the pen 5 by the user, a pen type indicating a kind of the pen 5, and the like, can also be set as data to be written in the report(s) R, as with the pen ID. A plurality of pieces of static data may be written into the report(s) R.

The device 3 need not perform the processing of steps S21 to S23 in FIG. 7 and the processing of steps S33 and S34 in FIG. 8 when the pen pressure value indicates that the pen 5 is in a hovering state (i.e., a state in which the pen tip is not in contact with the touch surface). This is because the host computer 4 does not generate stroke data when the pen 5 is in the hovering state. Then, the processing performed by the device 3 may be reduced.

In the present embodiment, while both of the static data (pen ID) and the less-frequent data (pen pressure value) are set as data to be written to the report(s) R in the buffer area B, only one of the static data and the less-frequent data may be set to be written in report(s) R.

A second embodiment of the present disclosure will next be described. The present embodiment is different from the first embodiment in that the device 3 is configured to process (e.g., modify) a pen pressure value included in one or more reports R yet to be transmitted in response to detection of a pen-up event. The second embodiment is otherwise similar to the first embodiment. Therefore, configurations similar to those of the first embodiment are identified by the same reference numerals, and the following description will be made focusing on differences from the first embodiment.

Figure 9:
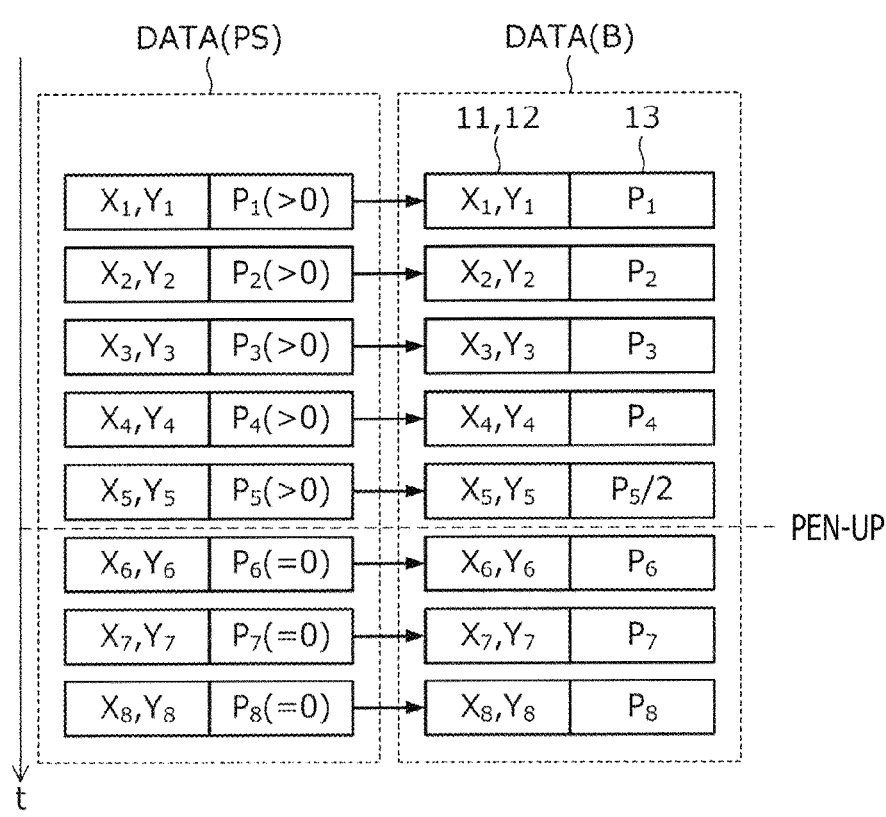
FIG. 9 is a diagram depicting a time sequential relationship between data DATA (PS) and data DATA (B) in a second embodiment of the present disclosure.

FIG. 9 is a diagram depicting a time sequential relationship between data DATA (PS) and data DATA (B) in the present embodiment. In an example of the figure, all of the data DATA (PS) includes a pen pressure value. Reports R stored in the buffer area B in correspondence with these pieces of data also include a pen pressure value.

In the example of FIG. 9, the pen pressure values $P_1$ to $P_5$ respectively correspond to a first to a fifth pen signal PS, and are higher than zero, while pen pressure values $P_6$ to $P_8$ corresponding to a sixth and subsequent pen signals PS are zero. The device 3 detects that the pen 5 is lifted (separated) from the panel ("pen-up" in FIG. 9) based on a change in the pen pressure value to zero or lower. Then, in response to the detection of the pen-up, the device 3 processes (e.g., modifies) a pen pressure value(s) included in one or more reports R yet to be transmitted. In the example of FIG. 9, a pen pressure value $P_5$ in a report R (fifth report R) generated immediately before the pen-up is rewritten to a value that is ½ of the pen pressure value $P_5$. Then, a sharp change in the pen pressure value at the time of the pen-up is mitigated. The line width or transparency of the drawn stroke data (which is based on a pressure value) is therefore prevented from changing abruptly, to render natural-looking handwriting.

Details of the pen pressure value processing are not limited to those depicted in FIG. 9. It is possible to adopt various other processing, such as rewriting pen pressure values $P_4$ and $P_5$ in two reports R (fourth and fifth reports R), which were generated immediately before the pen-up, to (⅔) $P_3$ and (⅓) $P_3$, respectively, using the pen pressure value $P_3$ in the report R immediately preceding the fourth and fifth reports R.

Figure 10:
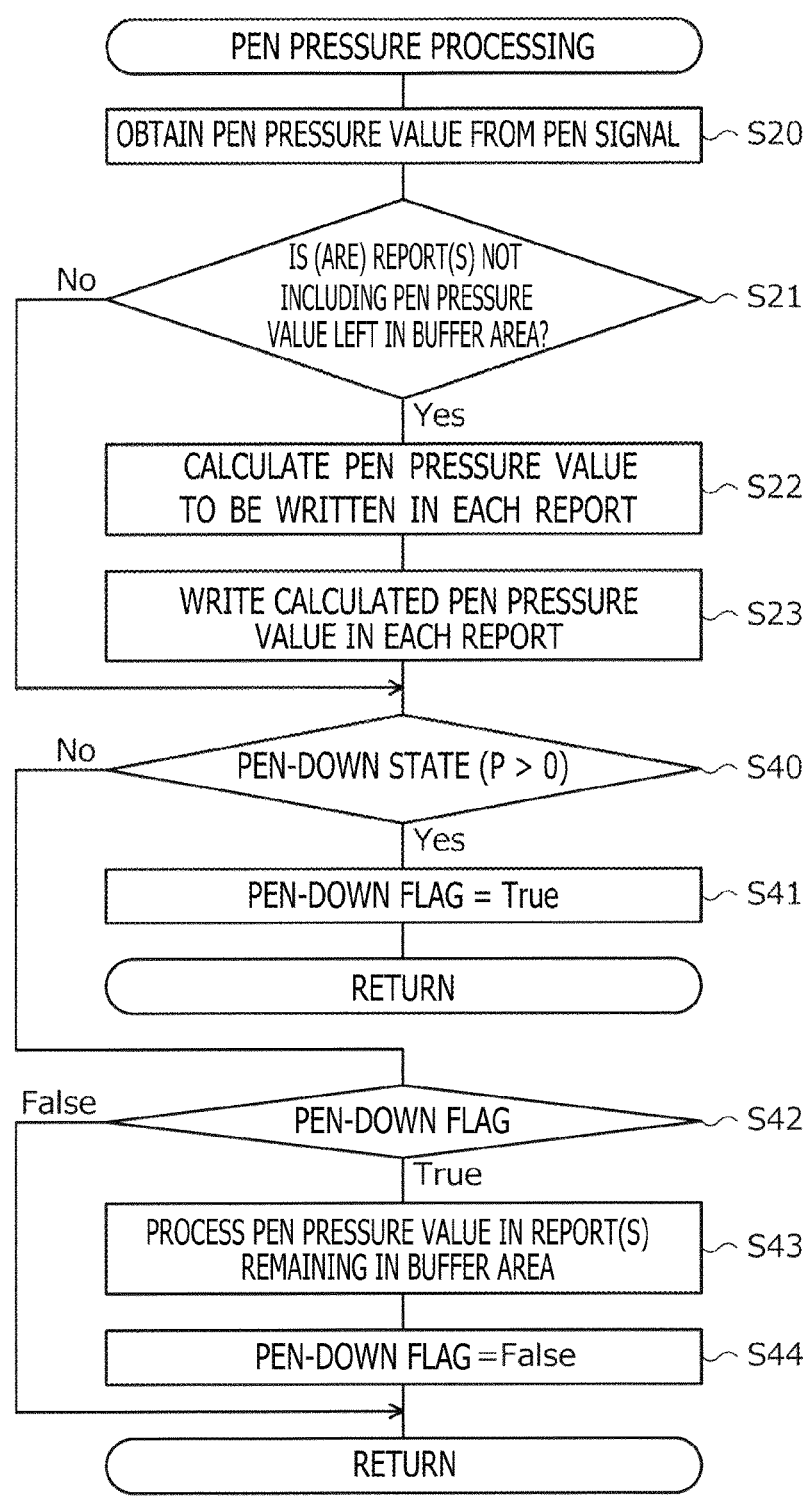
FIG. 10 is a diagram depicting details of pen pressure processing performed by a device according to the second embodiment of the present disclosure in step S7 of FIG. 6.

FIG. 10 is a diagram depicting details of the pen pressure processing performed by the device 3 according to the present embodiment in step S7 of FIG. 6. As is understood from comparison with FIG. 7, the pen pressure processing is formed by adding steps S40 to S44 to the end of the pen pressure processing described in FIG. 7. In the following, description will be made focusing on differences from FIG. 7.

After determining in step S21 that a report(s) R not including a pen pressure value do(es) not remain in the buffer area B, or after writing the pen pressure value to each report in step S23, the device 3 next determines whether or not a present state is a pen-down state (step S40). The determination is made by determining whether or not the pen pressure value obtained in step S20 is higher than zero.

When the device 3 determines in step S40 that the present state is the pen-down state (that is, the pen pressure value is higher than zero), the device 3 sets a pen-down flag as a Boolean type variable to "True," and then ends the pen pressure processing.

When the device 3 determines in step S40 that the present state is not the pen-down state (that is, the pen pressure value is equal to or less than zero), on the other hand, the device 3 next determines the value of the pen-down flag (step S42). When the pen-down flag is True as a result of the determination, the device 3 processes (e.g., modifies) a pen pressure value(s) in a report(s) R remaining in the buffer area B (step S43). Details of the processing are as described with reference to FIG. 9. After the device 3 ends step S43, the device 3 sets the pen-down flag to "False" (step S44), and then ends the pen pressure processing. When the device 3 determines in step S42 that the pen-down flag is False, the device 3 ends the pen pressure processing without performing steps S43 and S44.

According to the above processing, the pen pressure value(s) included in the one or more reports R yet to be transmitted can be processed (e.g., modified) immediately after a pen-up is detected (that is, when the present state is not the pen-down state and the pen-down flag is set to True). Hence, as described above, a sharp change in the pen pressure value at the time of the pen-up is avoided or reduced, so that natural-looking handwriting can be rendered.

While a report(s) R already generated at the time of a pen-up is (are) subject to the pen pressure value processing in the present embodiment, a report(s) R yet to be generated at the time of a pen-up can also be subjected to the pen pressure value processing. This aspect will be described in detail in the following with reference to FIG. 11 and FIG. 12.

Figure 11:
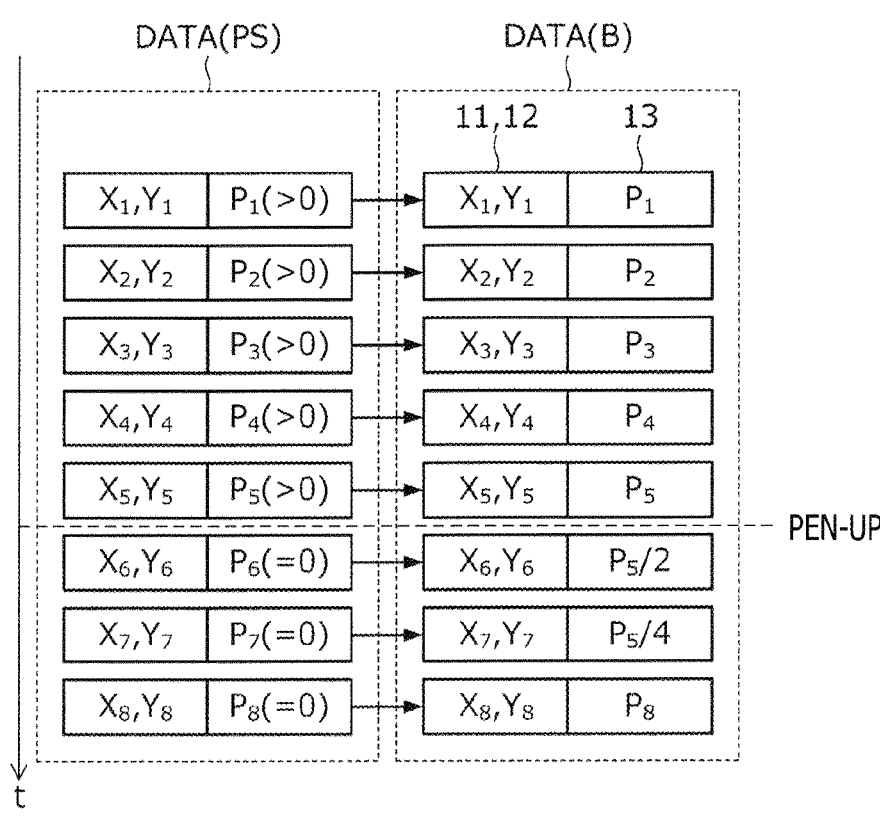
FIG. 11 is a diagram depicting a time sequential relationship between data DATA (PS) and data DATA (B) in a modification of the second embodiment of the present disclosure.

FIG. 11 is a diagram depicting a time sequential relationship between data DATA (PS) and data DATA (B) in a modification of the present embodiment. In the example of the figure, all of the data DATA (PS) includes a pen pressure value. Hence, reports R stored in the buffer area B in correspondence with these pieces of data also include a pen pressure value.

In the example of FIG. 11, the device 3 detects a pen-up according to a change in the pen pressure value $P_6$ corresponding to the sixth pen signal PS to zero or less. Then, in response to the detection of the pen-up, the device 3 processes (e.g., modifies) a pen pressure value(s) included in one or more reports R yet to be transmitted. In the present modification, the device 3 rewrites the pen pressure values in the sixth and subsequent reports R generated after the pen-up, rather than the fifth report R, to a value higher than zero. Specifically, the device 3 sets the pen pressure value of the sixth report R to $P_5/2$, and sets the pen pressure value of the seventh report R to $P_5/4$. Such processing also mitigates a sharp change in the pen pressure value at the time of the pen-up. The line width or transparency of the drawn stroke data (which is based on a pen pressure value) is therefore prevented from changing abruptly, to render natural-looking handwriting.

Figure 12:
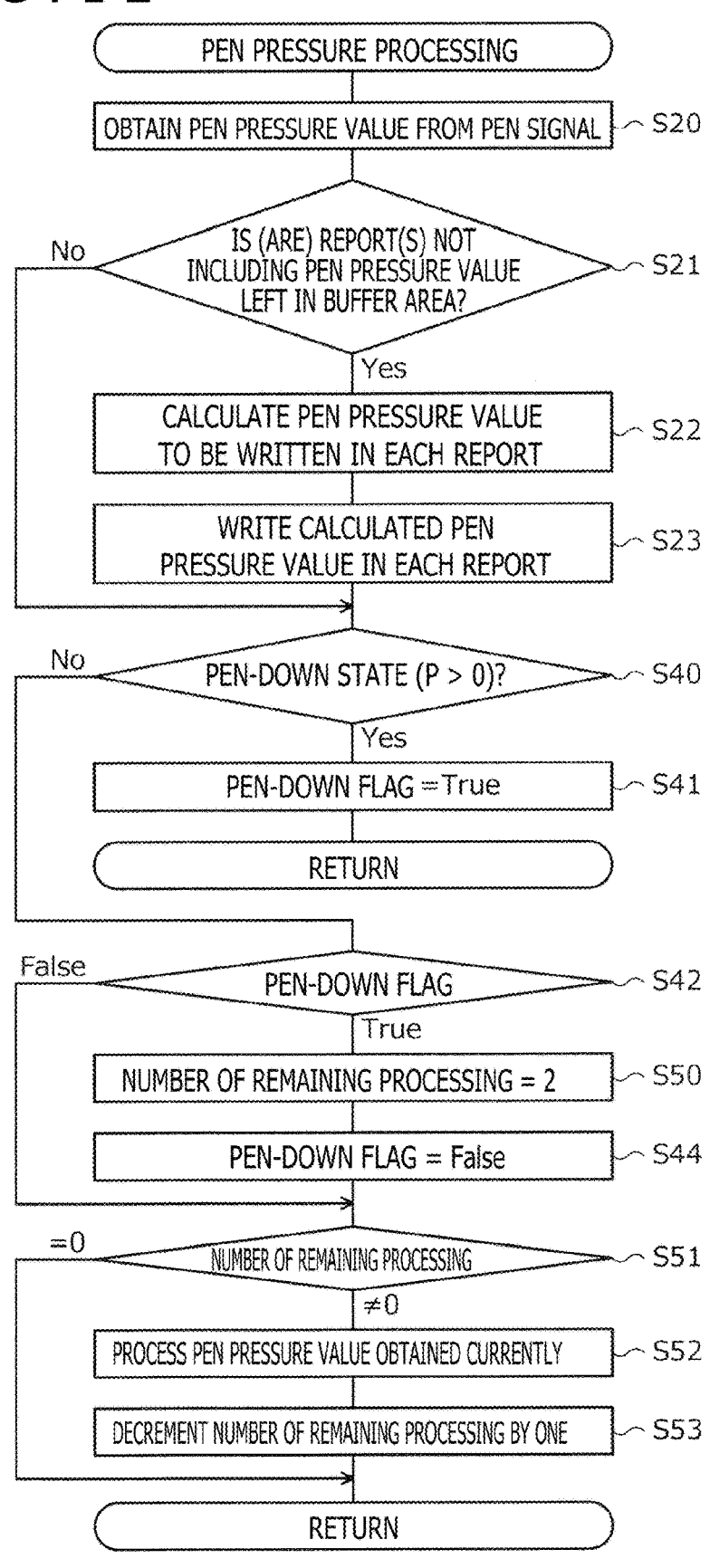
FIG. 12 is a diagram depicting details of pen pressure processing performed by a device according to the modification of the second embodiment of the present disclosure in step S7 of FIG. 6.

FIG. 12 is a diagram depicting details of the pen pressure processing performed by the device 3 according to the present modification in step S7 of FIG. 6. As is understood from comparison with FIG. 10, the pen pressure processing is formed by changing step S43 described in FIG. 10 to step S50, and further adding steps S51 to S53 to the end of the processing described in FIG. 10. In the following, description will be made focusing on differences from FIG. 10.

After determining in step S21 that the pen-down flag is set to True, the device 3 sets an integer type variable indicative of "a number of remaining processing (e.g., calculations)" to a determined (e.g., predetermined) value (step S50). The number of remaining processing represents the number of reports R in which the pen pressure value is to be processed (e.g., calculated) after the pen-up. The number of remaining processing is two in FIG. 12. However, the number of remaining processing may be one or three or more.

After determining in step S42 that the pen-down flag is set to False, or after setting the pen-down flag to False in step S44, the device 3 next determines whether or not the number of remaining processing is zero (step S51). When the device 3 determines that the number of remaining processing is zero, the device 3 ends the pen pressure processing. When the device 3 determines that the number of remaining processing is not zero, on the other hand, the device 3 processes (e.g., calculates or modifies) the currently obtained pen pressure value (step S52). For example, as for the sixth report R included in FIG. 11, the device 3 processes the currently obtained pen pressure value $P_6$ to $P_5/2$, using the pen pressure value $P_5$ written in the fifth report R. The processed pen pressure value is written in the corresponding report R in step S10 in FIG. 6. After ending the processing in step S52, the device 3 decrements the number of remaining processing by one (step S53), and then ends the pen pressure processing.

Thus, the present modification can also process a pen pressure value(s) included in one or more reports R yet to be transmitted immediately after detecting a pen-up (that is, when the present state is not the pen-down state and the pen-down flag is True). Hence, as described above, a sharp change in the pen pressure value at the time of the pen-up is mitigated, to render natural-looking handwriting.

While the present embodiment has been described as the device 3 which processes a pen pressure value(s) included in one or more reports R yet to be transmitted in response to the detection of a pen-up, the device 3 can be configured to process (e.g., modify) the pen pressure value(s) without performing the writing operation (e.g., as in FIG. 5) of the first embodiment. Also, the device 3 may be configured to perform both of the processing according to the second embodiment and the processing according to the modification of the second embodiment.

Preferred embodiments of the present disclosure have been described above. However, the present disclosure is not limited to those embodiments, and can be embodied in various modes within the scope of the present disclosure.

For example, while each of the foregoing embodiments assumes that the device 3 performs the whole processing according to the present disclosure, a part or the whole of the processing may be performed by the device 3's device driver, which operates on the host computer 4.

The invention claimed is:

1. A method performed by a device, for use with a touch surface on which a pen indicates a position, the method comprising:

securing a buffer area in a memory of the device for retaining one or more reports;

wherein each report includes a pen position on the touch surface derived based on signals from the touch surface and/or from the pen at each determined scanning time;

wherein each report additionally includes a pen pressure value indicating a pressure applied to a pen tip of the pen; and in response to detecting a pen-up event indicating that the pen is separated from the touch surface, modifying the pen pressure value included in one of the one or more reports that is generated before the pen-up event.

2. The method according to claim 1, wherein the report additionally includes static data which does not change per each scanning time.

3. The method according to claim 2, wherein the static data includes one or more of a pen ID for identifying the pen, a vendor identification for identifying a vendor of the pen, a color set to the pen by a user, or a pen type indicating a type of the pen.

4. The method according to claim 2, wherein the pen is configured to transmit the static data to the device in response to detection of contact of the pen with the touch surface.

5. The method according to claim 1, wherein the report additionally includes less-frequent data which is obtained less frequently than the position data.

6. The method according to claim 1, wherein the modifying the pen pressure value includes rewriting the pen pressure value.

7. The method according to claim 1, wherein the device is a touch controller coupled to the touch surface.

8. The method according to claim 1, wherein the device is a touch controller configured to generate the one or more reports.

9. The method according to claim 1, wherein the device is an electronic device configured to receive the one or more reports.

10. A touch controller configured to be coupled to a touch surface on which a pen indicates a position, the touch controller comprising:

a memory including a buffer area for retaining one or more reports; and processing circuitry coupled to the memory and configured to:

derive a pen position on the touch surface based on signals received by the touch controller from the touch surface and/or from the pen at each determined scanning time;

for each derived position, generate a report including the derived pen position and a pen pressure value, to thereby generate and store the one or more reports in the buffer area; and in response to detecting a pen-up event indicating that the pen is separated from the touch surface, modifying the pen pressure value included in one of the one or more reports that is generated before the pen-up event.

11. A method performed by a device, for use with a touch surface on which a pen indicates a position, the method comprising:

securing a buffer area in a memory of the device for retaining one or more reports, wherein each report includes a pen position on the touch surface derived based on signals from the touch surface and/or from the pen at each determined scanning time;

wherein each report additionally includes a pen pressure value indicating a pressure applied to a pen tip of the pen; and in response to detecting a pen-up event indicating that the pen is separated from the touch surface, modifying the pen pressure value included in one of the one or more reports that is generated after the pen-up event to a modified pen pressure value that is smaller than the pen pressure value immediately before the pen-up event and is greater than zero.

12. The method according to claim 11, wherein the report additionally includes static data which does not change per each scanning time.

13. The method according to claim 12, wherein the static data includes one or more of a pen ID for identifying the pen, a vendor identification for identifying a vendor of the pen, a color set to the pen by a user, or a pen type indicating a type of the pen.

14. The method according to claim 12, wherein the pen is configured to transmit the static data to the device in response to detection of contact of the pen with the touch surface.

15. The method according to claim 11, wherein the report additionally includes less-frequent data which is obtained less frequently than the position data.

16. The method according to claim 11, wherein the modified pen pressure value is ½ of the pen pressure value immediately before the pen-up event.

17. The method according to claim 11, wherein the modified pen pressure value is greater than 0.

18. The method according to claim 11, wherein the device is a touch controller coupled to the touch surface.

19. The method according to claim 11, wherein the device is a touch controller configured to generate the one or more reports.

20. The method according to claim 11, wherein the device is an electronic device configured to receive the one or more reports.

* * * * *